A. J. COLLAR.
GATE VALVE.
APPLICATION FILED NOV. 3, 1909.

982,036.

Patented Jan. 17, 1911.

Witnesses:
F. E. Maynard.
R. S. Burns.

Inventor;
Adoniram J. Collar;
By G. H. Strong.
his Atty.

UNITED STATES PATENT OFFICE.

ADONIRAM J. COLLAR, OF YREKA, CALIFORNIA.

GATE-VALVE.

982,036.

Specification of Letters Patent.

Patented Jan. 17, 1911.

Application filed November 3, 1909. Serial No. 526,031.

*To all whom it may concern:*

Be it known that I, ADONIRAM J. COLLAR, a citizen of the United States, residing at Yreka, in the county of Siskiyou and State of California, have invented new and useful Improvements in Gate-Valves, of which the following is a specification.

This invention relates to valves, and pertains especially to gate valves and ditch gates.

An important purpose of my invention is to provide a simple, reliable gate valve designed to lessen the friction encountered in operating the valve-gate.

It consists in the combination of parts, and in details of construction which will be more fully explained by reference to the accompanying drawings, in which—

Figures 1, 2:
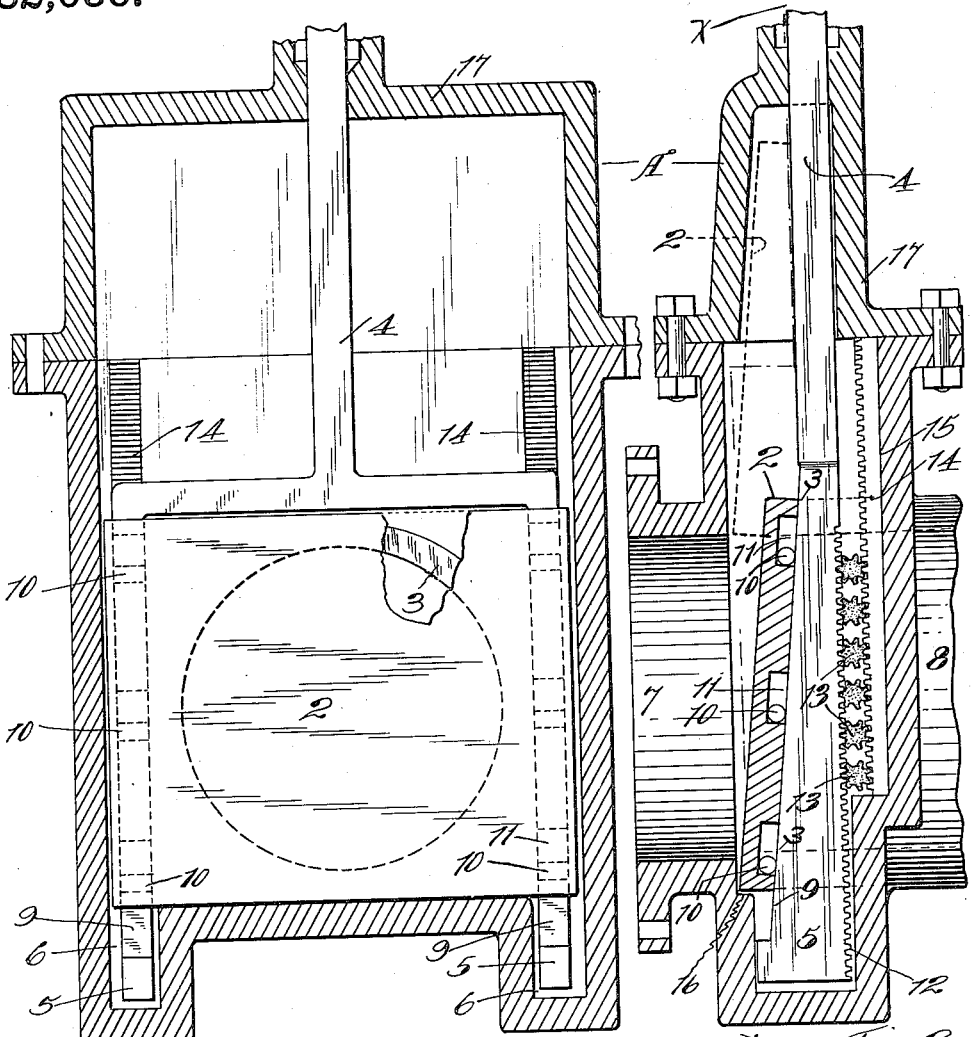
Figure 3:
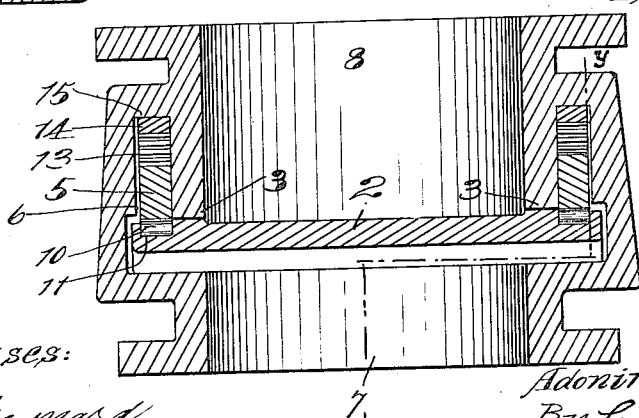

Figure 1 is a section on line $x$—$x$ Fig. 2. Fig. 2 is a vertical section of the valve on line $y$—$y$, Fig. 3, showing the stem in elevation. Fig. 3 is a central, horizontal section.

The feature of this valve, to which particular attention is directed, is the means by which the operation of the gate is accelerated and made easier, and while shown as comprising a casing A adapted to be coupled to a pipe system it is to be understood that this casing may be designed to comply with any requirements, or may be dispensed with entirely, and the gate 2 and its correlated parts may be mounted in concrete, as in dams, ditch-walls, coffers, or in any environment where a valve of large capacity is needed. The principle is equally applicable to small cocks and valves for ordinary uses. In this instance, the casing A is provided with an inclined seat 3 which may be removable or integral, and which may be of any desirable area and shape. The gate 2 is adapted to be raised or lowered by means of a stem 4 which is forked at its lower portion forming hooks 5—5 straddling the seat 3, and vertically slidable in pockets or channels 6—6 in the sides of the casing A. When the valve gate 2 is in its lowermost position, it is held tightly against the inclined seat 3 by the pressure of fluid in the inlet side 7 of the valve, thus cutting off flow to the outlet 8. One face 9 of each hook is inclined to correspond with the angle of the seat 3, and against the faces 9 rollers or balls 10 are adapted to bear. A suitable number of these rollers are freely mounted in recesses 11 contiguous to the vertical edges of the gate 2, and the opposite face of each hook bar 5 is serrated or provided with racks 12 engaging with a plurality of pinions 13 which, when the valve-gate 2 is down, assume a position approximately under the gate, traveling upward as the gate is raised, each pinion being restrained in its spacing from the adjacent ones by means of the rack 12, and a complementary rack-bar 14 inserted in slots 15 in the casing.

The operation of the valve is as follows: Power being applied in a suitable, convenient manner at the upper end of the stem 4, the initial vertical motion of the hooks or arms 5 causes the cam or inclined faces 9 to engage the rollers 10, and the continued raising of the hooks 5 is effective through the rollers to slightly press the gate 2 away from its seat 3. In a valve of the proportions shown, a vertical movement of one and one-half inches will move the gate horizontally, one-eighth inch, and a further lifting of the stem causes the hook 5 to engage the lower edge of the gate 2, and raise it vertically to the dotted line position, thus opening the valve to its full extent, meanwhile the pinions 13 have rolled upwardly along the racks 12—14 one-half the entire length of travel of the hooks 5—5, always maintaining their given space between centers. by lowering the valve-stem 4 the gate is again brought into register with its seat 3 until its lower edge encounters a stop or shoulder 16, when pressure will cause it to again tightly seat itself.

By this construction I have found that a valve may be opened with the application of very little power, and cannot stick, is easily assembled, and may be repaired by simply removing the cap 17 of the casing.

Having thus described my invention, what I claim and desire to secure by Letters Patent is—

1. The combination in a gate valve, of an inclined valve seat, a valve movable transversely of the fluid passage and closable upon said seat, a stem having inclined faces substantially parallel with the inclined valve seat, and means engaging the valve whereby the valve is moved from its seat previously to its being lifted.

2. The combination in a gate valve, of an inclined valve seat, a valve movable transversely of the fluid passage, and closable upon said seat, a stem having inclined faces substantially parallel with the inclined valve seat, antifrictional devices located between the valve and the inclined stem faces, and means carried by the stem engageable with the valve to lift and move it from its seat.

3. The combination with a gate valve movable transversely of a fluid passage, and having an inclined seat against which it is closable, of pockets in the back of the valve, a lifting stem having inclined faces corresponding with the incline of the valve seat, rolling antifrictional members located in the valve pockets and contacting with the inclined faces of the stem whereby the first lifting of the stem moves the valve away from its seat, and means carried by the stem whereby the valve is subsequently raised to an open position.

4. The combination with a fluid passage, and a gate or valve movable transversely thereto, of a seat against which the valve is closable, pockets or chambers formed in the back of the valve, rolling bearings carried in said pockets, a valve stem having a forked lower end, said forks having inclined surfaces corresponding with the incline of the valve seat, and against which surfaces the rolling bearings contact, and projections from the bottom of the stem forks adapted to engage and lift the valve after the valve has been moved from its seat by the action of the rolling bearings against the inclines of the stem.

5. In a gate valve, an inclined seat against which the gate is closable, antifrictional devices located in chambers on the back of the valve upon each side of the conduit, a vertically movable stem having forks with inclined surfaces at the lower ends against which the antifrictional devices may roll while advancing in their chambers, to first force the valve from its seat, and projections from the lower ends of the forks to subsequently engage and lift the valve.

6. In a gate valve, an inclined seat against which the gate is closable, antifrictional devices located in chambers on the back of the valve upon each side of the conduit, a vertically movable stem having forks with inclined surfaces at the lower ends against which the antifrictional devices may roll while advancing in their chambers, to first force the valve from its seat, and projections from the lower ends of the forks to subsequently engage and lift the valve, guides upon the vertical rear edges of the forks, fixed guides parallel therewith, and interengaging means movable between the parallel guides.

7. In a gate valve, an inclined seat against which the gate is closable, antifrictional devices located in chambers on the back of the valve upon each side of the conduit, a vertically movable stem having forks with inclined surfaces at the lower ends against which the antifrictional devices may roll while advancing in their chambers, to first force the valve from its seat, projections from the lower ends of the forks to subsequently engage and lift the valve, rack teeth upon the vertical rear edges of the forks, fixed opposed rack bars parallel with said edges, and pinions engaging and adapted to roll up and down between the rack bars.

In testimony whereof I have hereunto set my hand in the presence of two subscribing witnesses.

ADONIRAM J. COLLAR.

Witnesses:
R. S. BERRY,
W. R. DAVIS.